United States Patent
Ogilvie et al.

(10) Patent No.: US 12,014,312 B2
(45) Date of Patent: Jun. 18, 2024

(54) ASSEMBLY FOR DELIVERING A SHIPMENT

(71) Applicant: Deutsche Post AG, Bonn (DE)

(72) Inventors: Thomas Ogilvie, Bonn (DE); Matthäus Pruski, Troisdorf (DE); Ramin Benz, Bonn (DE)

(73) Assignee: Deutsche Post AG, Bonn (DE)

( * ) Notice: Subject to any disclaimer, the term of this patent is extended or adjusted under 35 U.S.C. 154(b) by 169 days.

(21) Appl. No.: 16/890,030

(22) Filed: Jun. 2, 2020

(65) Prior Publication Data

US 2020/0293980 A1 Sep. 17, 2020

Related U.S. Application Data

(62) Division of application No. 15/303,319, filed as application No. PCT/EP2015/057149 on Apr. 1, 2015, now abandoned.

(30) Foreign Application Priority Data

Apr. 11, 2014 (DE) ..................... 10 2014 105 196.3
Apr. 17, 2014 (DE) ..................... 10 2014 105 583.7

(51) Int. Cl.
*G06Q 10/083* (2023.01)
*A47G 29/14* (2006.01)
(Continued)

(52) U.S. Cl.
CPC .......... *G06Q 10/083* (2013.01); *A47G 29/14* (2013.01); *A47G 29/141* (2013.01); *B60L 53/00* (2019.02);
(Continued)

(58) Field of Classification Search
CPC .... G06Q 10/08; G06Q 10/087; G06Q 10/083; G06Q 10/0832; G06Q 10/08355;
(Continued)

(56) References Cited

U.S. PATENT DOCUMENTS

| 4,492,504 A | 1/1985 | Hainsworth |
| 7,591,630 B2 * | 9/2009 | Lert, Jr. ............... B65G 1/0492 414/280 |

(Continued)

FOREIGN PATENT DOCUMENTS

| CN | 1898128 A | 1/2007 |
| WO | WO 2007/065649 A2 | 6/2007 |

(Continued)

OTHER PUBLICATIONS

"Drones Take on New Context with Amazon." University Wire, Dec. 12, 2013, p. n/a. ProQuest. Web. Feb. 5, 2024 <https://dialog.proquest.com/professional/docview/1467289895?accountid=131444> (Year: 2013).*

(Continued)

*Primary Examiner* — Michael P Harrington
(74) *Attorney, Agent, or Firm* — Woodard, Emhardt, Henry, Reeves & Wagner, LLP

(57) ABSTRACT

The invention relates to an assembly comprising an unmanned transport device for delivering a shipment and a transfer device, said transfer device being designed to lower the shipment from the unmanned transport device to a receiving container, to lift the shipment from the receiving container to the transport device and/or to transfer said shipment between the transport device and the receiving container, the shipment being guided in each case by the transfer device.

5 Claims, 2 Drawing Sheets

(51) Int. Cl.
| | |
|---|---|
| *B60L 53/00* | (2019.01) |
| *B60L 53/51* | (2019.01) |
| *B60L 53/57* | (2019.01) |
| *B64C 39/02* | (2023.01) |
| *B64D 1/22* | (2006.01) |
| *B64D 45/08* | (2006.01) |
| *B64F 1/04* | (2006.01) |
| *B65G 67/00* | (2006.01) |
| *B65G 67/24* | (2006.01) |
| *B66C 1/02* | (2006.01) |
| *B66F 9/02* | (2006.01) |
| *G06Q 10/08* | (2023.01) |
| *G06Q 10/0832* | (2023.01) |
| *G07F 17/12* | (2006.01) |
| *B64U 50/19* | (2023.01) |
| *B64U 101/60* | (2023.01) |

(52) U.S. Cl.
CPC ........... *B60L 53/51* (2019.02); *B60L 53/57* (2019.02); *B64C 39/024* (2013.01); *B64D 1/22* (2013.01); *B64D 45/08* (2013.01); *B64F 1/04* (2013.01); *B65G 67/00* (2013.01); *B65G 67/24* (2013.01); *B66C 1/02* (2013.01); *B66F 9/02* (2013.01); *G06Q 10/08* (2013.01); *G06Q 10/0832* (2013.01); *G07F 17/13* (2020.05); *A47G 2029/145* (2013.01); *A47G 2029/149* (2013.01); *B64U 50/19* (2023.01); *B64U 2101/60* (2023.01)

(58) Field of Classification Search
CPC .. G06Q 10/0836; G06Q 10/0835; B64D 9/00; B64D 1/22; B64D 1/02; B66F 9/02
See application file for complete search history.

(56) References Cited

U.S. PATENT DOCUMENTS

| | | | | |
|---|---|---|---|---|
| 8,643,850 B1* | 2/2014 | Hartman | ............... | B66C 13/085 356/141.2 |
| 8,899,903 B1* | 12/2014 | Saad | ............ | B60L 53/34 320/109 |
| 9,365,348 B1* | 6/2016 | Agarwal | ............ | B65G 1/137 |
| 9,489,490 B1 | 11/2016 | Theobald | | |
| 2002/0154974 A1 | 10/2002 | Fukuda et al. | | |
| 2007/0063096 A1* | 3/2007 | Tanabe | .................. | B64C 39/10 244/4 R |
| 2009/0078818 A1 | 3/2009 | Zulkowski et al. | | |
| 2011/0084162 A1* | 4/2011 | Goossen | ............... | B64D 1/22 244/135 C |
| 2013/0166108 A1 | 6/2013 | Sturm | | |
| 2014/0032034 A1* | 1/2014 | Raptopoulos | ...... | H04B 7/18506 701/25 |
| 2014/0149244 A1* | 5/2014 | Abhyanker | ........ | G06Q 30/0605 705/26.2 |
| 2015/0158587 A1* | 6/2015 | Patrick | .................. | B64D 1/22 701/3 |

FOREIGN PATENT DOCUMENTS

| | | |
|---|---|---|
| WO | WO 2008/085547 A2 | 7/2008 |
| WO | WO 2014/080389 A2 | 5/2014 |
| WO | WO 2015061008 A1 | 4/2015 |

OTHER PUBLICATIONS

International Search Report from related PCT/EP2015/057149 dated May 11, 2015.
Suzuki, et al; Automatic Battery Replacement System for UAVs: Analysis and Design; J Intell Robot Syst.; Sep. 9, 2011.
Written Opinion from related PCT/EP2015/057149 dated May 11, 2015.
Chinese Office Action and Partial English Translation received in related CN201580019278.6 dated Sep. 17, 2020 (pp. 11).
Danko, T.W., Design and Control of a Hyper-Redundant Manipulator for Mobile Manipulating Unmanned Aerial Vehicles, J. Intell Robot Syst (2014) 73:709-723 (pp. 15).
Machine translation of CN1898128A by Patbase on Nov. 16, 2020 (pp. 28).

* cited by examiner

ASSEMBLY FOR DELIVERING A SHIPMENT

CROSS-REFERENCE TO RELATED APPLICATIONS

This application is a divisional of U.S. patent application Ser. No. 15/303,319 filed Oct. 11, 2016, which is a national stage of PCT/EP2015/057149 filed Apr. 1, 2015, which claims priority to German Patent Application No. 10 2014 105 196.3 filed Apr. 11, 2014 and German Patent Application No. 10 2104 105 583.7 filed Apr. 17, 2014, which are all hereby incorporated by reference.

BACKGROUND

The invention relates to an assembly comprising an unmanned transport device for delivering a shipment and a transfer device. The invention also relates to a method for transferring the shipment between the unmanned transport device and a receiving container.

As a result of increasing freight traffic, such as general cargo and grouped cargo shipping via truck transports or container transports by sea freight or air freight and the transport of parcels with use for example of e-commerce as well as online mail-order services, the number of goods in transit and in particular of parcel shipments has significantly increased. Whereas ordering can be done independently of conventional shop opening hours, the order must still be delivered as a shipment to the customer by means of conventional delivery procedures, for example by postmen or, in the case of parcel shipments, by motorised delivery vehicles. An attempt to deliver the shipment to the customer is generally made just once per day.

If the customer is not home at the time of attempted delivery, for example because the customer, as an employed individual, is at work, either an attempt is made to deliver the shipment another time, or the shipment is stored at a branch of the delivery company for collection by the customer. For some time now, it has been possible to have the shipment delivered to collection points, such as automatic parcel pick-up machines, such as DHL Packstations or Amazon Lockers, however, these collection points generally are not located in the direct vicinity of the home address of the customer or addressee of the shipment, and therefore are not located in the immediate area of disposition of the addressee.

More recently, attempts have therefore been made to deliver shipments by means of an unmanned transport device, for example an unmanned flying machine, also referred to as a parcelcopter, flying transport device, or drone. In the case of these attempts, a receiving container arranged in the area of disposition of the addressee is often provided in order to receive the shipment, the unmanned flying machine being able to deliver the shipment to said receiving container or the unmanned flying object being able to pick up the shipment from said receiving container. Once the shipment has been delivered by the unmanned flying object to the receiving container, which for example is installed in the front garden of the addressee's house, the addressee can remove the shipment from the receiving container.

However, in the case of the aforementioned attempts, the actual delivery of the shipment from the unmanned flying machine to the receiving container has proven to be extremely difficult. A first challenge lies in the fact that the unmanned flying machine has to land accurately on the receiving container so that the shipment can then be transferred. A "dropping" of the shipment from the unmanned flying machine onto the receiving container has proven to be impracticable, since fragile goods contained in the shipment are often damaged as a result. In other cases the unmanned flying device cannot land on the receiving container due to the geographical or structural conditions, and therefore the shipment must be delivered over a distance of 2 m between the unmanned flying machine, which has landed in the vicinity of the receiving container, and the receiving container. Besides unmanned flying machines, further unmanned transport devices also exist, such as self-steering vehicles or ships, which experience similar problems. To summarise, the transfer of the shipment over what is known as the 'last metre' between an unmanned transport device and receiving container constitutes a significant problem.

SUMMARY

Proceeding from this situation, the object of the present invention is to specify a possibility for transferring a shipment safely from an unmanned transport device to a receiving container, i.e. in particular in such a way that the content of the shipment remains intact as it is transferred over the 'last metre'.

The object of the invention is achieved by the features of the independent claims. Advantageous embodiments are specified in the dependent claims.

The object is therefore achieved by an assembly comprising an unmanned transport device for delivering a shipment and a transfer device, wherein the transfer device is designed to lower the shipment from the unmanned transport device to a receiving container, to lift the shipment from the receiving container to the transport device and/or to transfer said shipment between the transport device and the receiving container, the shipment being guided in each case by the transfer device.

A key point of the invention is therefore that the shipment is not "left to drop" from the unmanned transport device, but instead is guided by the transfer device during the transfer. This means that, during the lowering, the lifting and/or the transfer of the shipment, the position of the shipment relative to the transport device and/or the receiving container is in each case guided, preferably in a dedicated way, by the transfer device on account of the embodiment of the transfer device. By contrast, when an unmanned flying machine as unmanned transport device by way of example flies towards the receiving container and remains above the receiving container at a distance of a metre, there is no dedicated guidance of the shipment by the transfer device when the shipment is left to fall from the flying machine to the receiving container.

By means of the proposed assembly, fragile goods as shipments can thus be transferred between an unmanned transport device and a receiving container in a safe manner, in particular by lowering or lifting the shipment, without fear of damaging the shipment. It is thus possible in particular to easily and safely deliver fragile everyday goods, such as eggs or yoghurts, to a customer or addressee by means of the unmanned transport device, regardless of shop opening hours.

The shipment can be embodied arbitrarily in principle, for example as a mail item, as a parcel, as a recorded mail item, as a letter, or other transportable item, and can be arranged by way of example in a container, a case and/or a box. The receiving container is preferably arranged in the area of disposition of an addressee of the shipment or customer who has ordered the shipment, by way of example in the front garden of a house and/or on a roof of the house, such that, in the event of an unmanned flying machine as transport device, the transport device can fly towards the receiving container in a particularly simple manner. The shipment is more preferably lowered, lifted and/or transferred between transport device and receiving container when the distance between the transport device and receiving container is less than 5 m, 3 m, 2 m, 1 m, 0.5 m or 0.25 m, or when the transport device rests against the receiving container with contact, for example, in the case of an unmanned flying machine, when the flying machine has landed on the receiving container. The shipment is more preferably lowered, lifted and/or transferred at a constant speed of 1 m/s, 0.5 m/s, 0.2 m/s or 0.1 m/s, for example.

Various possibilities exist in principle for the embodiment of the transfer device. In accordance with a preferred development, however, provision is made for the transfer device to be embodied as a vertically and/or horizontally adjustable lifting table, in particular as a scissor lifting table, as a vertically and/or horizontally adjustable lift, as a vertically and/or horizontally adjustable platform, as a vertically and/or horizontally adjustable gripper arm, as a cable winch and/or in a self-mobile manner. The aforementioned means are preferably vertically and/or horizontally adjustable over a distance of at least 0.2 m, 0.5 m, 1 m, 2 m or 5 m. The means can be fixedly connected to the transport device and/or to the receiving container. It is also possible for both the transport device and the receiving container to each have a gripper arm by way of example. The gripper arm is more preferably designed to separate a number of shipments and is arranged below the flying transport device as a construction movable in the x- and y-direction. The gripper arm is more preferably formed by a mechanical, hydraulic and/or pneumatic device movable in the aforementioned directions.

If, in the case of a flying transport apparatus in the form of an unmanned transport device, the transport apparatus has landed on a receiving container formed as a box, i.e. contacts the box via skids of the transport apparatus, the lifting table in an exemplary embodiment can move vertically towards the shipment until a surface of the lifting table comes to rest with contact against the shipment fixed beneath the transport apparatus. If the shipment is then released from the flying machine, the shipment does not fall from the transport apparatus onto the receiving container, in contrast to embodiments known from the prior art. The lifting table can then be lowered away from the transport apparatus towards the receiving container so that the shipment by way of example can then be stored in an interior of the receiving container ready for collection by the customer.

If, however, the unmanned transport device is embodied as a self-driving vehicle, which for transfer of the shipment has moved as far as a short distance of, for example, less than a metre from the receiving container, the transfer device performs a movement in the horizontal direction in order to transfer the shipment. For this purpose, the transfer device can be embodied by way of example as a horizontally adjustable platform, which, in order to transfer the shipment, moves in the horizontal direction, for example in the form of a horizontally adjustable platform, towards the receiving container. In case of a self-mobile embodiment of the transfer device, it is preferred for the transfer device to be able to move in a self-steering, self-moving and/or autonomous manner in a region between the transport device and receiving container in order to transfer the shipment. In this case, the transfer device can have a drive and wheels or similar means.

In the case of a cable winch, the cable winch is preferably arranged on the flying transport apparatus in such a way that, either when the flying machine lands on the receiving container or even during the flight, the shipment can be winched down towards the receiving container and/or can be winched up from the receiving container towards the transport apparatus by means of the cable winch. Aforementioned embodiments of the transfer device in any case constitute technical means by means of which the shipment can be transferred in a guided manner between transport device and receiving container, wherein the shipment preferably rests against the corresponding means, with contact, during the transfer. The lifting table, the lift, the platform, the gripper arm and/or the cable winch more preferably each have a gripper device, by means of which the shipment can be fixed to the transfer device so that the shipment therefore cannot unintentionally fall or slip from the transfer device during the transfer.

In accordance with a further preferred embodiment the transfer device is arranged on the transport device and the transfer device is embodied as a suction device for suctioning and for lowering and/or lifting the shipment. The suction device is preferably embodied as a vacuum or comparable means, in such a way that the shipment can be suctioned by the suction device on account of a negative pressure produced by the suction device and can thus be lowered or lifted in a guided manner, for example from a flying transport apparatus which has landed on the receiving container. The shipment can be transferred between the transport device and receiving container in a particularly safe and controlled manner by a "nozzle function" of this type implemented by means of the suction device.

In accordance with yet a further preferred embodiment the transfer device has a guide device designed to guide the shipment during the lowering, lifting and/or transfer of the shipment. The guide device can be formed by a rail, by means of which the shipment is guided during the transfer and cannot unintentionally fall. The guide device can also be embodied as a clip or a fixing device for fixing the shipment during the lowering, lifting or transfer of the shipment. As a result of the guide device, the shipment remains in a defined or dedicated position during the transfer and cannot be damaged as a result of falling or slipping unintentionally.

In accordance with another preferred development the assembly comprises the receiving container, wherein the receiving container has a container interior and a closable opening, through which the shipment can be transferred by means of the transfer device between the transport device and the receiving container, wherein the transfer device is arranged and embodied in the container interior in such a way that the transfer device is arranged within the container interior when the opening is closed and can extend through the opened opening in order to transfer the shipment. The transfer device is arranged within the container interior in a manner protected against weather effects as a result of this embodiment.

The receiving container more preferably has a proximity sensor and/or a communications device connected to the transport device for communication therewith. If it is now determined by the receiving container that the transport device is approaching the receiving container in order to transfer the shipment, for example by wireless and/or wired receipt of a notification, the opening preferably opens so that the shipment can be transferred through the opening by means of the transfer device. The concept of "transfer of the shipment" is to be understood in this respect to be synonymous with lifting or lowering.

In principle, the shipment can be transported by the transport device in a manner unprotected against weather effects, for example in a manner fastened to a flying transport device by means of a gripper device. In accordance with a particularly preferred embodiment the transport device comprises a receiving device, in particular a box and/or a case, for receiving the shipment, wherein the transfer device is designed to transfer the shipment into and/or from the receiving device. The receiving device is preferably formed from a weather-resistant, moisture-resistant and/or impact-resistant material, which offers the advantage that the shipment transported in the receiving device is protected for example against damage by rain during the transport by means of the transport device. The receiving device is more preferably formed from a polystyrene or other rigid foam, which is advantageous in the case of a flying transport device on account of the low weight.

The receiving device more preferably can be closed, for example is formed in two parts as a case having a lid that can close the case. The transfer device is even more preferably designed to transfer the shipment into an interior of the receiving device, for example by lowering or lifting, and/or to remove the shipment from the interior of the receiving device. In accordance with an additional embodiment the receiving device has at least two levels and/or chambers each for receiving at least one shipment, and the transfer device is designed to transfer the shipment in all levels and/or chambers. An advantage of this embodiment is that a number of shipments can be received in the receiving device and at the same time transported by the transport device. A particular shipment can be removed by the transfer device and transferred to the receiving container. With a design of this type, the transport device, as unmanned flying transport apparatus, can fly to a number of receiving containers in succession and can collect and/or deliver shipments from/to the receiving containers by transfer by means of the transfer device, said shipments then being received in or removed from a corresponding level or chamber within the receiving device.

In accordance with yet a further preferred embodiment the receiving device is arranged and embodied on the transport device in such a way that the flying transport device with the receiving device can land on the receiving container, in particular with contact. The receiving device thus comes into direct contact with the receiving container, which further simplifies the transfer of the shipment by means of the transfer device, since the shipment must be transferred over a much shorter distance between the transport device and receiving container than if, for example, the flying transport device did not land on the receiving container and instead remained flying at a distance of 1 m above the receiving container in order to transfer the shipment.

In accordance with a particularly preferred embodiment the unmanned transport device is embodied as a flying machine, in particular as an aircraft, as a UAV, which is short for unmanned, uninhabited or unpiloted aerial vehicle, as a parcelcopter, as a drone, as a vehicle, i.e. as a self-steering vehicle, and/or as a floating object. Possible embodiments of the unmanned flying machine or UAV can include helicopters, multicopters, for example quadcopters, or tiltwing aircraft, to list just a few possibilities. If, within the scope of the invention reference is made to a flying machine or drone, all possible embodiments and also UAVs, etc., as specified above are thus also intended.

The unmanned transport device more preferably has mechanical and/or IT properties, referred to hereinafter as "intelligence", which allow the unmanned transport device to independently reach the receiving container. The intelligence can be embodied as a microprocessor, as a control device and/or as a memory-programmable controller, preferably so as to enable autonomous behaviour of the transport device. The transport device can additionally have sensors, which enable the optical, acoustic, olfactory and/or data signal-based identification for interpretation of environmental signals and/or can have mechanical components which contain the components necessary for autonomous and/or automatic movement in space towards and/or away from the receiving container and for the transfer and/or takeover of the shipment. Lastly, the transport device can have a communications device in order to be connected to a central server device and/or the receiving container for communication therewith.

The receiving container can be embodied arbitrarily in principle and preferably has a housing, wherein one or more doors are provided on the housing, through which door(s) an addressee of the shipment or customer who ordered the shipment can access the shipment and/or can store a shipment in the receiving container for collection by the transport device. The receiving container is very particularly preferably embodied, however, as a letterbox, parcel box, letter and parcel box and/or Packstation (drop-off and pickup station) for receiving the shipment.

In accordance with yet a further preferred embodiment the transfer device is arranged on the transport device, wherein the transfer device has an electronic acknowledgement device for acknowledging a transfer of the shipment by a person, and the acknowledgement device is arranged on the transfer device in such a way that the acknowledgement device can be lowered away from the transport device and/or can be lifted towards the transport device. The acknowledgement device is preferably embodied as a touchpad so that the person, preferably the customer who ordered the shipment or the addressee of the shipment, can easily confirm or acknowledge receipt of the shipment by providing a signature.

The object addressed by the invention is also achieved by a method for transferring a shipment between an unmanned transport device and a receiving container, the method having the following steps:

lowering the shipment from the unmanned transport device to the receiving container, guided by the transfer device, transferring the shipment between the unmanned transport device and the receiving container, guided by the transfer device, and/or lifting the shipment from the receiving container to the transport device, guided by the transfer device.

By means of the proposed method, the shipment can be transferred particularly easily between the unmanned transport device and the receiving container, the shipment being guided by the transfer device during the entire transfer and in this respect cannot unintentionally fall and thus become damaged. Advantageous embodiments of the method will become clear to a person skilled in the art by analogy with the assembly described above.

The invention will be explained in greater detail hereinafter on the basis of a preferred embodiment with reference to the accompanying drawing, in which:

DETAILED DESCRIPTION OF THE DRAWING

Figure 1:
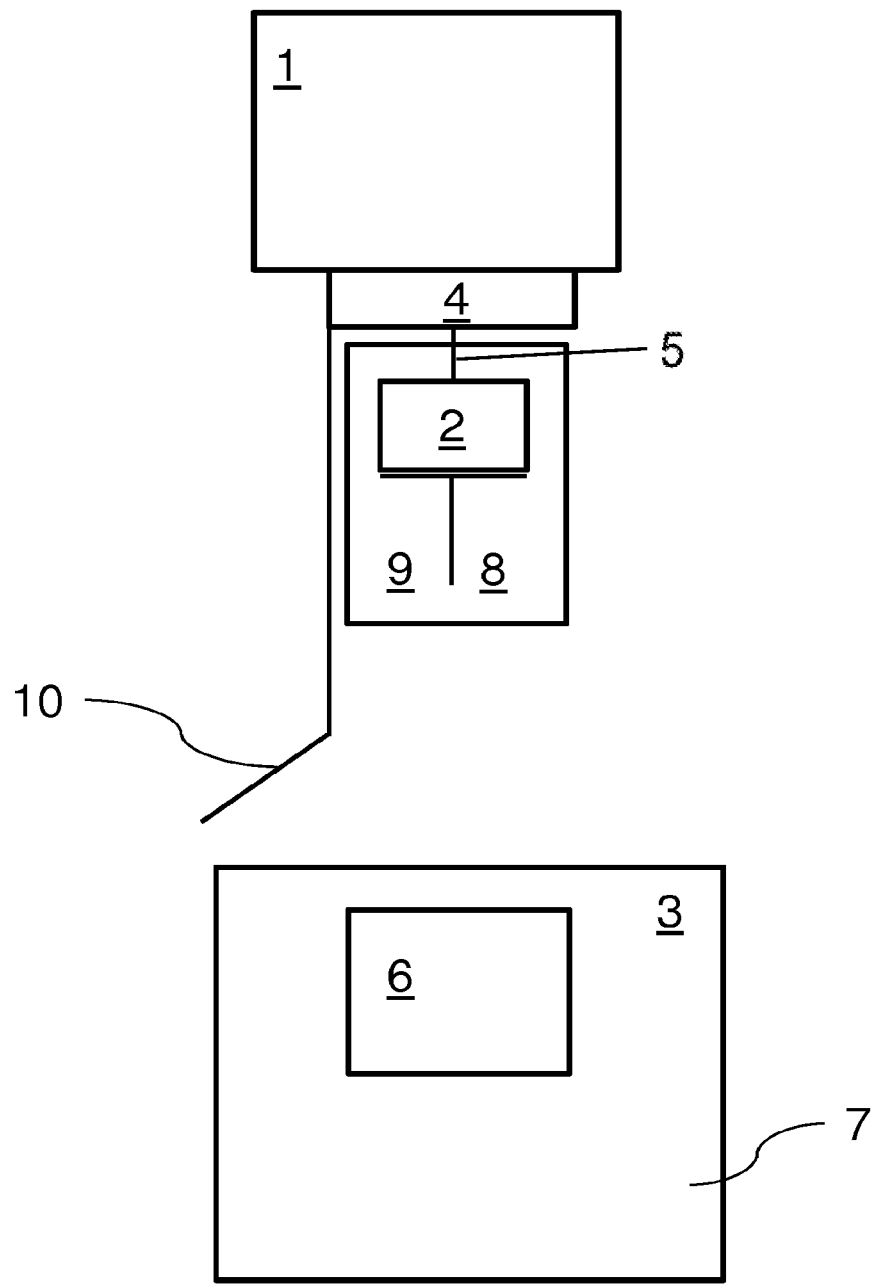
FIG. 1 shows a schematic view of the assembly in accordance with a preferred exemplary embodiment of the invention.

FIG. 1 shows a schematic view of an assembly in accordance with a preferred exemplary embodiment of the invention, comprising an unmanned transport device 1, which in the present case is formed as a flying transport apparatus, i.e. as a drone or parcelcopter. The transport device 1 is designed to deliver a shipment 2, in the present case a parcel shipment, to a receiving container 3, which in the present case is formed as a parcel box.

In order to transfer the shipment 2, a transfer device 4 is provided, which in accordance with the present exemplary embodiment is arranged on the transport device 1. The transfer device 4 is designed to transfer the shipment 2 to the receiving container 3 by lowering said shipment from the transport device 1 to the receiving container 3, wherein the shipment 2 is guided by the transfer device 4 during the transfer. For guidance, a guide device 5 embodied as a rail is provided, which guides the shipment 2 with contact along the guide device 5 during the lowering of the shipment 2 from the transport device 1 to the receiving container 3.

The transfer device 4 is formed in the present case as a gripper arm, which is arranged beneath the flying transport apparatus 1 on a construction consisting of x- and y-axes and is movable in the x- and y-directions. The gripper arm 4 can be moved in the z-direction, i.e. towards the receiving container 3 and also in the direction of the transport device 1, by means of a mechanical-hydraulic drive via a cable winch. The shipment 2 can thus be lowered from the transport device 1 to the receiving container 3, and for example can be deposited in a container interior 7 of the receiving container 3 through a closable opening 6 of the receiving container 3.

The transport device 4 also comprises a receiving device 8, which in the present case is formed as a box for receiving the shipment 2 so that the shipment 2 is protected against weather effects during transport by means of the transport device 1. A number of levels 9 or chambers 9 are provided in the receiving device 8, such that a number of shipments 2 of different sizes can be conveyed in the receiving device 8. The dimensioning of the receiving device 8 is selected in such a way that the flying transport apparatus 1 can land on the receiving container 3 with the receiving device 8 touching down first, wherein the receiving device 8 is shorter lengthwise than the x- and y-axis construction and the gripper arm 4 fastened to the receiving device 8.

Lastly, the transfer device 4 also has an acknowledgement device 10, which is formed as a touchpad, such that an addressee of the shipment or customer who ordered the shipment 2 can acknowledge receipt of the shipment 2 on the touchpad by means of a signature. The acknowledgement device 10 can be lowered away from the transport device 4 or can be lifted towards the transport device 4.

Figure 2:
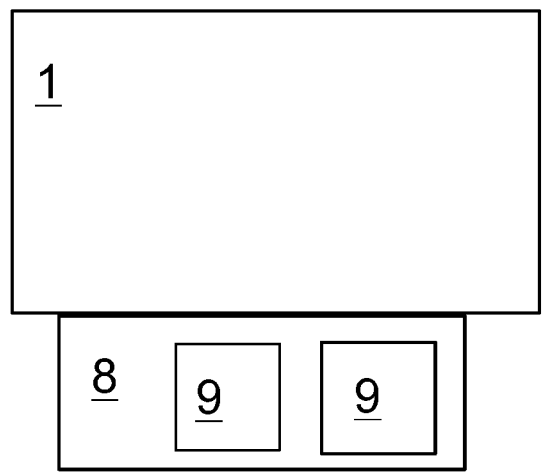
FIG. 2 shows a schematic view of an alternative embodiment of the assembly.
Figure 2:
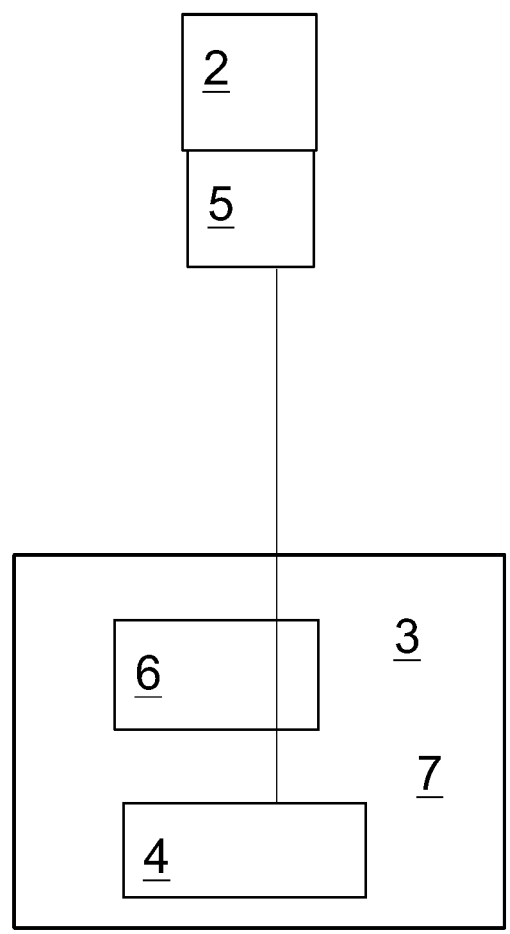

FIG. 2 shows a schematic view of an alternative embodiment of the assembly, comprising an unmanned transport device 1, which in the present case is formed as a flying transport apparatus, i.e. as a drone or parcelcopter. The transport device 1 is designed to deliver a shipment 2 to container interior 7 of receiving container 3. Container 3 includes closable opening 6 that provides access to container interior 7.

Transport device 1 includes receiving device 8 that includes a number of levels 9 or chambers 9 that can each receive a shipment 2, such that a number of shipments 2 of different sizes can be conveyed in the receiving device 8. The dimensioning of the receiving device 8 is selected in such a way that the flying transport apparatus 1 can land on the receiving container 3 with the receiving device 8 touching down first, wherein the receiving device 8 is shorter lengthwise than the x- and y-axis construction.

In order to transfer the shipment 2, a transfer device 4 is arranged in container interior 7 of receiving container 3. The transfer device 4 is designed to transfer the shipment 2 between container interior 7 and chambers 9 or levels 9 by extending between container interior 7 to levels 9 or chambers 9 by passing through opening 6. Transfer device 4 includes guide device 5 that guides shipment 2 when being transferred between container interior 7 and chambers 9 or levels 9.

LIST OF REFERENCE SIGNS transport device 1
shipment 2
receiving container 3
transfer device 4
guide device 5
opening 6
container interior 7
receiving device 8
level, chamber 9
acknowledgment device 10

The invention claimed is:

1. An assembly transferring a shipment, the assembly comprising:
   an unmanned transport device designed to fly and adapted to transport and deliver the shipment, wherein the transport device comprises a receiving device for receiving the shipment, wherein the receiving device is formed from a rigid foam material, can be closed and has at least two chambers each adapted to receive at least one shipment;
   a receiving container comprising a container interior adapted to contain the shipment and a closable opening adapted to receive the shipment, wherein the receiving container is selected from the group comprising a letterbox, parcel box, a combination letter and parcel box, and drop-off and pickup station, and wherein the receiving device is constructed and arranged to land on the receiving container with the receiving device contacting the receiving container before the unmanned transport device contacts the receiving container if the unmanned transport device lands on the receiving container; and
   a transfer device arranged on and beneath the unmanned transport device, wherein the transfer device is adapted to extend through the closable opening and within the container interior, wherein the transfer device is adapted to transfer the shipment from the flying unmanned transport device to the container interior;
   wherein the transfer device is adapted to lower the shipment from the unmanned transport device to the receiving container, to lift the shipment from the receiving container to the transport device and to transfer the shipment between the transport device and the receiving container, wherein the transfer device is adapted to guide the shipment from the unmanned transport device to the receiving container in each case,
   wherein the transfer device is operable over a distance of at least 0.5 m and is adapted to deliver the shipment to the receiving container and to lift the shipment from the receiving container while the unmanned transport device remains flying, and wherein the transfer device is embodied as a vertically and/or horizontally adjustable gripper arm.

2. The assembly according to claim 1, comprising a guide device adapted to guide the shipment during the transfer of the shipment, wherein the guide device is embodied as a suction device adapted to apply suction to the shipment and to also lower and/or lift the shipment.

3. The assembly according to claim 1, wherein the unmanned transport device is embodied as a flying machine selected from the group consisting of an aircraft, a UAV, a drone, a parcelcopter, a helicopter, a multicopter, a quadcopter, a tiltwing aircraft, a vehicle, and a floating object.

4. The assembly according to claim 1, wherein the transfer device is operable over a distance of at least 1 m.

5. The assembly according to claim 1, wherein the transfer device is adapted to lift the shipment from the receiving container when the unmanned transport device is flying at a distance of 1 m above the receiving container.

* * * * *